US012632674B2

(12) United States Patent
Sao et al.

(10) Patent No.: US 12,632,674 B2
(45) Date of Patent: May 19, 2026

(54) SYSTEMS AND METHODS TO MANIFEST A SOFTWARE ARCHITECTURE BLUEPRINT IN A VIRTUAL INFRASTRUCTURE

(71) Applicant: FACETS CLOUD INC., Lewes, DE (US)

(72) Inventors: Anshul Sao, Bangalore (IN); Rohit Raveendran, Bangalore (IN); Pravanjan Choudhury, Bangalore (IN)

(73) Assignee: FACETS CLOUD INC., Lewes, DE (US)

( * ) Notice: Subject to any disclaimer, the term of this patent is extended or adjusted under 35 U.S.C. 154(b) by 260 days.

(21) Appl. No.: 18/502,540

(22) Filed: Nov. 6, 2023

(65) Prior Publication Data

US 2025/0021310 A1     Jan. 16, 2025

(30) Foreign Application Priority Data

Jul. 15, 2023    (IN) .............................. 202341047726

(51) Int. Cl.
| | |
|---|---|
| *G06F 8/20* | (2018.01) |
| *G06F 8/34* | (2018.01) |
| *G06F 9/455* | (2018.01) |
| *G06F 11/3604* | (2025.01) |
| *G06F 40/40* | (2020.01) |
| *G06F 11/34* | (2006.01) |
| *G06F 21/57* | (2013.01) |

(Continued)

(52) U.S. Cl.
CPC ................ G06F 40/40 (2020.01); G06F 8/20 (2013.01); G06F 8/34 (2013.01); G06F 9/45558 (2013.01); G06F 11/3612 (2013.01);

*G06F 11/3466* (2013.01); *G06F 21/577* (2013.01); *G06Q 10/0633* (2013.01); *H04L 41/12* (2013.01)

(58) Field of Classification Search
CPC ...... H04L 41/12; G06F 11/3466; G06F 40/40; G06F 9/45558; G06F 8/34; G06F 21/577; G06F 11/3612; G06F 8/20; G06Q 10/0633
See application file for complete search history.

(56) References Cited

U.S. PATENT DOCUMENTS

| | | | | | |
|---|---|---|---|---|---|
| 9,621,428 | B1 * | 4/2017 | Lev | ......................... | H04L 41/12 |
| 11,233,708 | B1 * | 1/2022 | Bawcom | ........... | G06Q 10/0633 |

(Continued)

OTHER PUBLICATIONS

Wu, Qing-jian, CN 114489955 (translation) May 13, 2022, 7 pgs <CN_114489955.pdf>.*

*Primary Examiner* — Tuan A Vu
(74) *Attorney, Agent, or Firm* — Vorys, Sater, Seymour and Pease LLP

(57) ABSTRACT

The present invention provides a system for creating a manifestation of a software architecture blueprint in a virtual infrastructure. The system includes an interface to receive the software architecture blueprint capturing an intent of the user in a configuration language. The system further includes a control module to facilitate selection of the virtual infrastructure and map each block of the blueprint to a corresponding block of the virtual infrastructure using a map that depends on a type of the virtual infrastructure. The system includes an execution module to connect to the virtual infrastructure, and translate one or more corresponding blocks of the software architecture blueprint into an environment for deployment on the virtual infrastructure.

20 Claims, 5 Drawing Sheets

(51) Int. Cl.
  *G06Q 10/0633* (2023.01)
  *H04L 41/12* (2022.01)

(56) References Cited

U.S. PATENT DOCUMENTS

| | | | | |
|---|---|---|---|---|
| 2021/0028993 A1* | 1/2021 | Kavadimatti | ......... | G06F 11/3466 |
| 2021/0055917 A1* | 2/2021 | Khakare | ............. | G06F 9/45558 |
| 2021/0357206 A1* | 11/2021 | Karve | ................. | G06F 11/3612 |
| 2023/0161870 A1* | 5/2023 | Herzberg | .............. | G06F 21/577 |
| | | | | 726/22 |
| 2023/0252233 A1* | 8/2023 | Gutierrez | ................ | G06F 40/40 |
| | | | | 704/9 |
| 2024/0028308 A1* | 1/2024 | Lee | ........................... | G06F 8/34 |

\* cited by examiner

SYSTEMS AND METHODS TO MANIFEST A SOFTWARE ARCHITECTURE BLUEPRINT IN A VIRTUAL INFRASTRUCTURE

CROSS REFERENCE TO RELATED APPLICATION

This application claims a benefit of, and priority to, India Provisional Patent Application No. 202341047726, filed Jul. 15, 2023, the contents of which is incorporated by reference in its entirety.

FIELD

Embodiments of the present invention relate generally to creation of software architecture blueprints, and more particularly to manifestation of software architecture blueprints in multiple virtual infrastructure environments.

BACKGROUND

Currently, companies face a dearth of DevOps engineers to manage and develop software blueprints on various environments. Usually, due to inadequate and non-optimal automation, lack of expertise on behalf of the DevOps engineers, and lack of standardization procedures and practices, blueprints are not being developed efficiently.

As a result, the agility of the team is hampered due to inefficiencies in the DevOps process. Companies end up spending money due to wastage of cloud resources and increased cloud costs. Issues and inefficiencies take time to get resolved due to a lack of visibility and tribal knowledge among silos and individuals. As a result, companies are running in suboptimal, secure, and non-standard cloud operations. In the case of multiple environments, drift in configuration, alerts, and other parameters may occur which may result in outages.

One solution to the aforementioned problem, is to write a best-in-class infrastructure as code, and have a team dedicated to maintain the same. Terraform, Pulumi, Ansible and the like are some of the enablers that help achieve the above objective. The solution is as good as having a code irrespective of the language chosen. There are other point tools like CD tools, and technologies which solve very specific automation problems but do not address all the issues mentioned above.

Hence, there is a need for developing a method and system that is closer to the DevOps engineers or developers, so that the intent of the developer can be easily captured according to the level of understanding of the developer. The method and system should enable the developer to manifest a software architecture blueprint for multiple environments such as virtual infrastructures. Accordingly, a method and system that facilitates the manifestation of the software architecture blueprint for virtual infrastructure is disclosed.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for creating a manifestation of a software architecture blueprint in a virtual infrastructure is disclosed. The system includes an interface configured to receive the software architecture blueprint created by a user, wherein the software architecture blueprint captures an intent of the user in a configuration language. The system further includes a control module configured to facilitate selection of the virtual infrastructure; and map each block of the blueprint to a corresponding block of the virtual infrastructure using a map that depends on a type of the virtual infrastructure. Further, the system includes an execution module configured to connect to the virtual infrastructure; and translate one or more corresponding blocks of the software architecture blueprint into an environment for deployment on the virtual infrastructure.

In another embodiment, a method for manifesting software architecture blueprints in a virtual infrastructure is disclosed. The method includes receiving the software architecture blueprint created by a user, the software architecture blueprint captures an intent of the user in a configuration language; facilitating a selection of the virtual infrastructure; mapping each block of the software architecture blueprint to a corresponding block of the virtual infrastructure by using a map that depends on a type of the virtual infrastructure; connecting to the virtual infrastructure; and translating one or more corresponding blocks of the software architecture blueprint into an environment for deployment on the virtual infrastructure.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
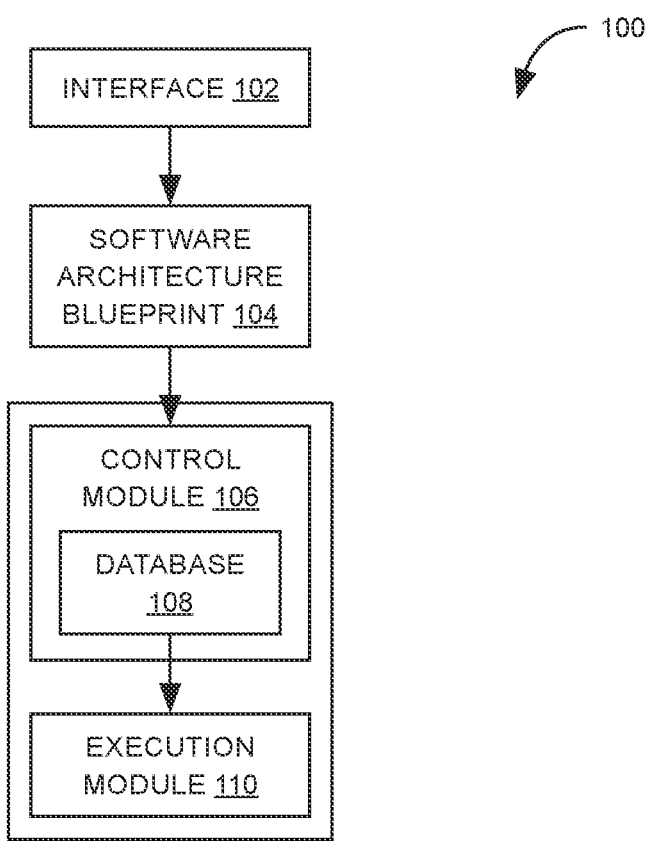
FIG. 1 is an example of a system for manifesting software architecture blueprints, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for storage architecture that is scalable, performant and cost effective compared to the current storage architectures.

FIG. 1 illustrates a block diagram of a system 100 for manifesting a software architecture blueprint 104. The system 100 includes an interface 102, a control module 106, a database 108, and an execution module 110.

As shown, the interface 102 is configured to receive the software architecture blueprint 104 (hereinafter referred to as "blueprint 104"), from a user. The system 100 can also include a user interface that facilitates access to the system for the user. The user interface can also facilitate the user to control access, environment-specific overrides, and trigger a plurality of automation processes. The user interface is hosted on a premises of a customer. The configuration language is a JSON manifest per resource. The blueprint 104, and configurations are stored in a GIT repository. Typically, the blueprint 104 captures an intent of the user in a configuration language and is created manually by the user.

The control module 106, is configured to facilitate selection of the virtual infrastructure and map each block of the blueprint to a corresponding block of the virtual infrastructure using a map that depends on a type of the virtual infrastructure. The execution module 110, is configured to communicably connect to the virtual infrastructure and translate one or more corresponding blocks of the software architecture blueprint 104 into an environment for deployment on the virtual infrastructure.

The control module 106 is configured to select a corresponding block for each block from the virtual infrastructure, wherein the virtual infrastructure is selected from among a plurality of cloud infrastructures comprising Amazon Web Services (AWS), Microsoft Azure and Google Cloud Platform (GCP). The control module 106 is configured to manage a plurality of environments using similar blueprint definitions as present in the software architecture blueprint 104. The control module 106, facilitates a version control of the blueprint 104, and configuration. The control module 106 also provides a visibility to a structure of the system 100, a number of mutations for the blueprint 104, and a number of changes requested for the blueprint 104, among other parameters.

The control module 106, comprises a database 108, and is configured to store a plurality of blocks, and one or more corresponding blocks against each block, where a corresponding block is an implementation of each block in the virtual infrastructure, and where each block depends on the type of the virtual infrastructure. The database 108 is further configured to store a plurality of mappings of each block, where each mapping is applicable to a particular type of the virtual infrastructure. In this example embodiment, the virtual infrastructure comprises a cloud system having a plurality of resource types comprising a plurality of microservices, databases, caches and queues.

The execution module 110 comprises a pluggable architecture and accommodates custom Infrastructure-As-Code (IaC) for automaton in the selected virtual infrastructure. The execution module 110, is configured to generate a plurality of environments within the virtual infrastructure, where each environment corresponds to a resource in the software blueprint architecture 104. In an embodiment, each of the plurality of environments comprises a set of configurations applicable to the one or more corresponding blocks. Example of an environment includes Terraform code blocks. The execution module 110, also generates the virtual infrastructure conforming to one or more predefined principles of cloud architecture design, and provide an observability, where the observability includes a visibility into a cost performance, security and operational health of the manifested infrastructure.

The system 100, further includes an AI module that generates one or more new agents and manifestations for detection of one or more anomalies in the environment and employs generative AI methodologies to facilitate identification and mitigation of infrastructure issues. An environment in which functioning of the system can be explained in provided in FIG. 2.

Figure 2:
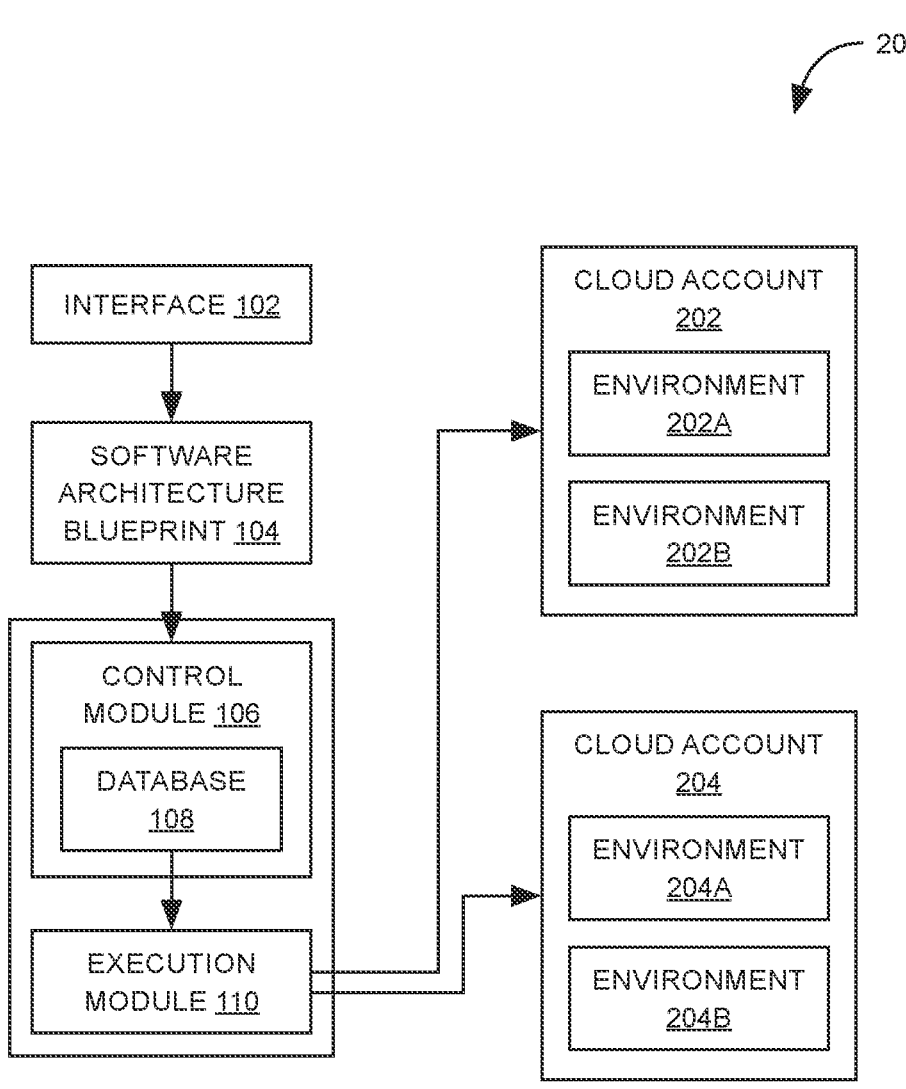
FIG. 2 illustrates an example environment where the system of FIG. 1 is hosted, according to some aspects of the present description.

FIG. 2 illustrates an environment 200, in which system 100 manifests the blueprint 104, in multiple environments. As shown, the blueprint 104 is received from the interface 102, and is processed by the control module 106. The configurations of the multiple environments (e.g., 202*a*, 202*b*, 204*a*, and 204*b*) are used to create different manifestations of the blueprint 104. The execution module 110, hosts the blueprint 104, onto the various environments (e.g. 202*a*, 202*b*, 204*a*, and 204*b*). In an embodiment, as shown the environment 202*a* and 202*b* may be associated to a cloud account 202, and the environments 204*a* and 204*b* may be associated with another cloud account 204.

Figure 3:
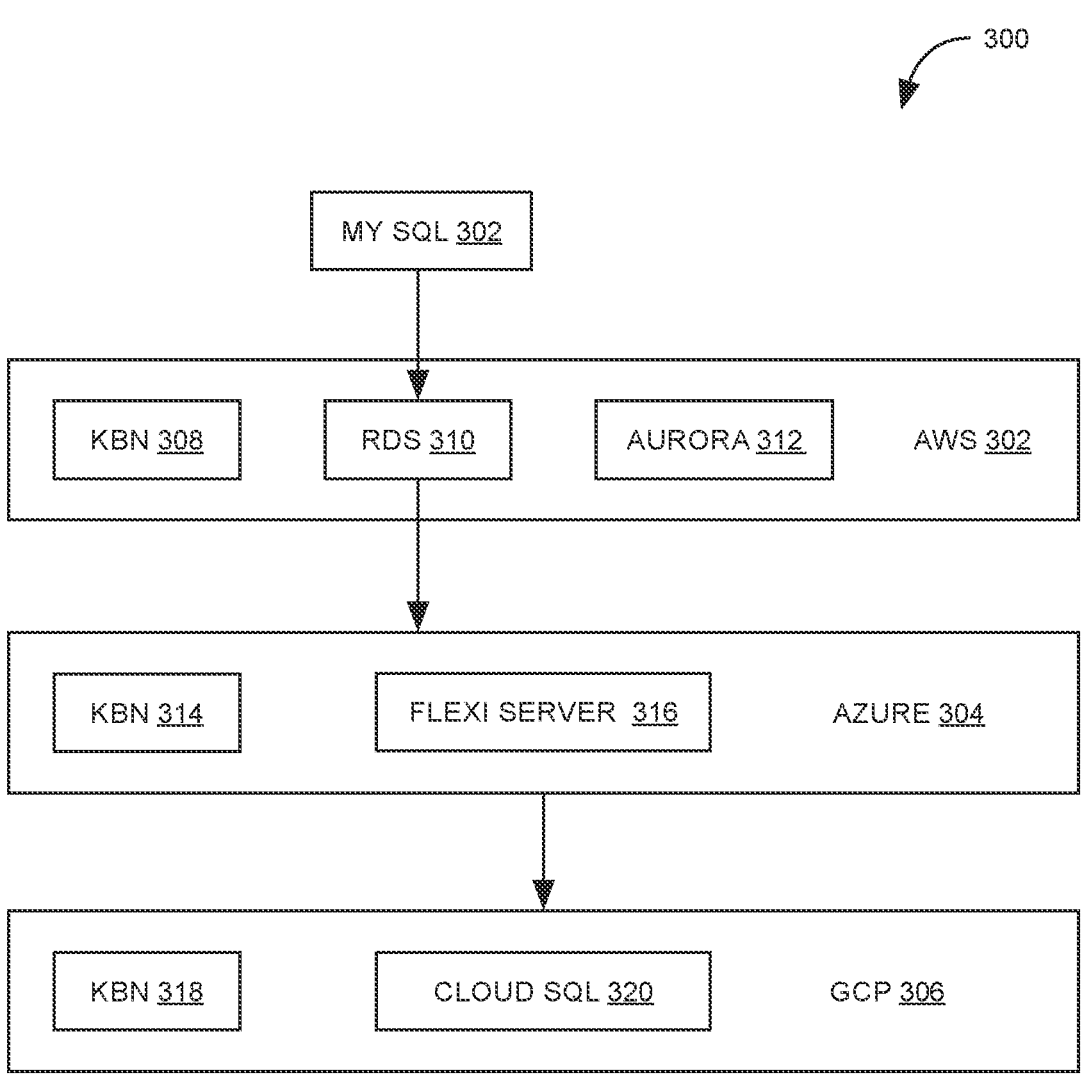
FIG. 3 illustrates an example of manifesting the software architecture blueprint on multiple cloud environments, according to some aspects of the present description.

FIG. 3 illustrates various examples of clouds such as AWS 302, Azure 204, and GCP 206. The configuration language can be MY SQL 302, in which the blueprint 104 is created. The blueprint 104, can be hosted on the multiple cloud environments AWS 302, Azure 204, and GCP 206, as shown.

Figure 4:
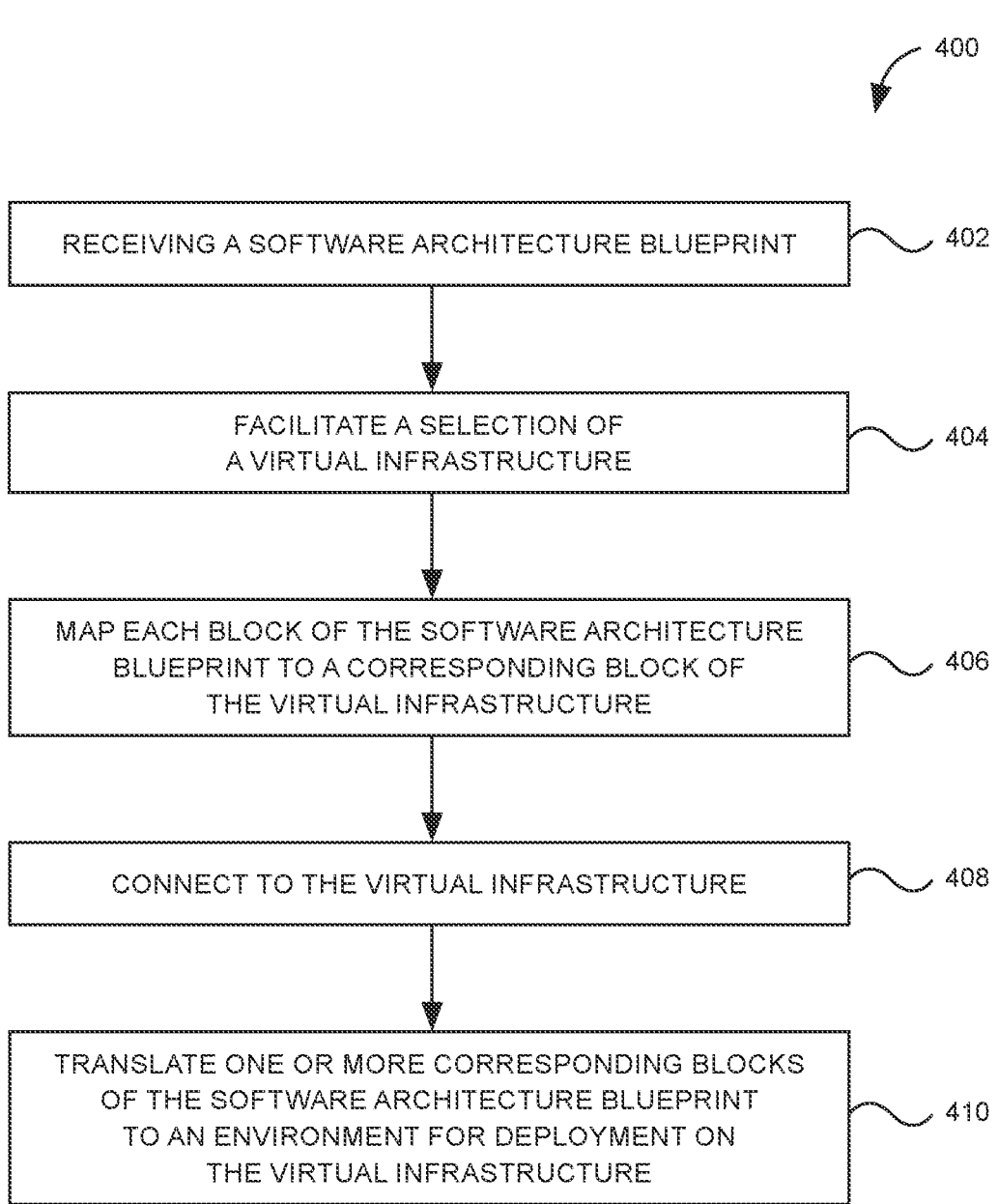
FIG. 4 is a flowchart depicting a method for manifesting software architecture blueprints, according to some aspects of the present description.

FIG. 4 is a flowchart 400, depicting a method for creating a manifestation of a software architecture blueprint (hereinafter referred to as a blueprint) in a virtual infrastructure.

At block 402, the method receives a blueprint created by a user. The blueprint captures an intent of the user in a configuration language.

At block 404, a virtual infrastructure is selected. The virtual infrastructure is selected from among a plurality of cloud infrastructures, comprising Amazon Web Services (AWS), Microsoft Azure, and Google Cloud Platform (GCP).

At block 406, each block of the blueprint is mapped to a corresponding block of the virtual infrastructure by using a map that depends on a type of the virtual infrastructure. In an embodiment, the user is enabled to select the corresponding block for each block from the virtual infrastructure.

At block 408, the virtual infrastructure is connected to the system.

At block 410, one or more corresponding blocks is translated by the blueprint into an environment for deployment on the virtual infrastructure. In an embodiment, the virtual infrastructure is generated that conforms to one or more predefined principles of cloud architecture design. The method also includes providing an observability, where the observability includes a visibility into a cost performance, a security, and an operational health of the manifested infrastructure.

The method further includes, generating one or more new agents and manifestations for detection of one or more anomalies in the environment, and employing generative AI methodologies to facilitate identification and mitigation of infrastructure issues. An example of proactive identification is explained hereinbelow.

Figure 5:
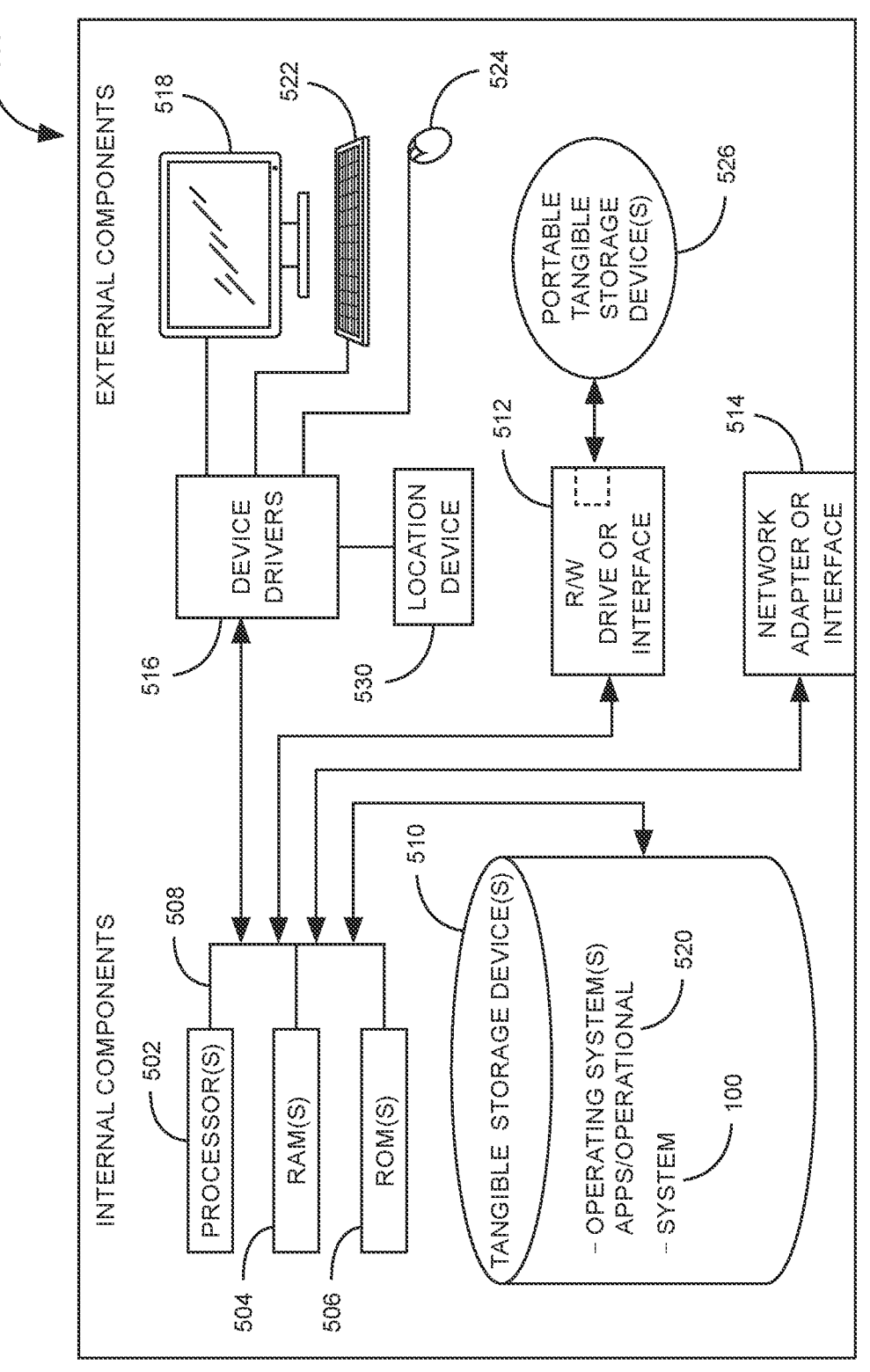
FIG. 5 is a block diagram illustrating an example computer system, according to some aspects of the present description.

The modules of the system (100) for performing antivirus scan on a virtual machine, described herein are implemented in computing devices. One example of a computing device (500) is described below in FIG. 5. The computing device (500) includes one or more processor(s) (502), one or more computer-readable RAMs (504) and one or more computer-readable ROMs (506) on one or more buses (508). Further, computing device (500) includes a tangible storage device (510) that may be used to execute operating systems (520) and the system (100). The various modules of the online review system (100) may be stored in the tangible storage device (510). Both, the operating systems (520) and the online platform system (100) are executed by the one or more processor(s) (502) via one or more respective RAMs (504) (which typically include cache memory). The execution of the operating systems (520) and/or the online platform system (100) by the one or more processor(s) (502), configures the one or more processor(s) (502) as a special purpose processor configured to carry out the functionalities of the operation systems (520) and/or the system (100) as described above.

Examples of the tangible storage device (510) include semiconductor storage devices such as ROM, EPROM, flash memory or any other computer-readable tangible storage device that may store a computer program and digital information.

Computing device (500) also includes a R/W drive or interface (514) to read from and write to one or more portable computer-readable tangible storage devices (528) such as a CD-ROM, DVD, memory stick or semiconductor storage device. Further, network adapters or interfaces (512) such as a TCP/IP adapter cards, wireless Wi-Fi interface cards, or 3G or 4G wireless interface cards or other wired or wireless communication links are also included in computing device.

In one example embodiment, the system (100) may be stored in the tangible storage device (510) and may be downloaded from an external computer via a network (for example, the Internet, a local area network or other, wide area network) and network adapter or interface (512).

Computing device (500) further includes device drivers (516) to interface with input and output devices. The input and output devices may include a computer display monitor (518), a keyboard (522), a keypad, a touch screen, a computer mouse (524), and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

What is claimed is:

1. A system for creating a manifestation of a software architecture blueprint in a virtual infrastructure, wherein the system comprises:

an interface configured to:
receive the software architecture blueprint created by a user, wherein the software architecture blueprint captures an intent of the user in a configuration language that declaratively specifies infrastructure resources to be provisioned;
a control module configured to:
facilitate selection of the virtual infrastructure from among a plurality of available cloud infrastructures; and
map each of a plurality of blocks of the software architecture blueprint to a corresponding block of the virtual infrastructure using a map that depends on a type of the virtual infrastructure, wherein each of the plurality of blocks identifies the infrastructure resources to be instantiated in the selected virtual infrastructure; and
an execution module configured to:
connect to the virtual infrastructure; and
translate one or more corresponding blocks of the software architecture blueprint into an environment for deployment on the virtual infrastructure, wherein the translation provisions the infrastructure resources as computational resources including at least one of virtual machines, containers, networks, or storage in the virtual infrastructure based on the software architecture blueprint.

2. The system of claim 1, wherein the control module is further configured to select an additional corresponding block for each of the plurality of blocks from the virtual infrastructure, wherein the virtual infrastructure is selected from among a plurality of cloud infrastructures comprising Amazon Web Services (AWS), Microsoft Azure and Google Cloud Platform (GCP).

3. The system of claim 1, wherein the control module is further configured to manage multiple environments using similar blueprint definitions as present in the software architecture blueprint.

4. The system of claim 1, wherein the execution module comprises a pluggable architecture to accommodate custom Infrastructure-as-Code (IaC) templates for automation in the selected virtual infrastructure, wherein the pluggable architecture enables integration of provider-specific IaC tools for deploying the infrastructure resources to different cloud platforms.

5. The system of claim 1, wherein the execution module is further configured to generate a plurality of environments within the virtual infrastructure, wherein each of the plurality of environments corresponds to a resource in the software blueprint architecture.

6. The system of claim 5, wherein each of the plurality of environments comprises a set of configurations applicable to the one or more corresponding blocks.

7. The system of claim 1, wherein the control module is further configured to facilitate a version control of the software architecture blueprint and configuration, providing a visibility to a structure of the system, a number of mutations of the software architecture blueprint, and a number of changes requested for the software architecture blueprint.

8. The system of claim 1, wherein the control module comprises:
  a database configured to:
    store the plurality of blocks, and the one or more corresponding blocks against each of the plurality of blocks, wherein each of the one or more corresponding blocks represents an implementation, of each of the plurality of blocks, in the virtual infrastructure, and wherein each of the plurality of blocks depends on the type of the virtual infrastructure; and
    store a plurality of mappings for each of the plurality of blocks, wherein each of the plurality of mappings is applicable to a particular type of the virtual infrastructure, and wherein each of the plurality of mappings correlates blueprint-defined infrastructure components with provider-specific resource types in the virtual infrastructure.

9. The system of claim 1, wherein the virtual infrastructure comprises a cloud system having a plurality of resource types comprising a plurality of microservices, databases, caches and queues.

10. The system of claim 1, further comprising:
  a user interface configured to facilitate access to the user, control of the access, environment-specific overrides, and to trigger a plurality of automation processes.

11. The system of claim 10, wherein the user interface is hosted on a premises of a customer.

12. The system of claim 1, wherein the configuration language is a JSON manifest per resource.

13. The system of claim 1, wherein the software architecture blueprint and configurations are stored in a GIT repository.

14. The system of claim 1, wherein the execution module is further configured to:
  generate the virtual infrastructure, the generating conforming one or more predefined principles of cloud architecture design; and
  provide an observability, wherein the observability includes a visibility into a cost performance, a security, and an operational health of the generated virtual infrastructure.

15. The system of claim 1, further comprising:
  an AI module configured to:
    generate one or more new agents and manifestations for detection of one or more anomalies in the environment; and
    employ generative AI methodologies to facilitate identification and mitigation of infrastructure issues.

16. A method for creating a manifestation of a software architecture blueprint in a virtual infrastructure, the method comprising:
  receiving the software architecture blueprint created by a user, wherein the software architecture blueprint captures an intent of the user in a configuration language that declaratively specifies infrastructure resources to be provisioned;
  facilitating a selection of the virtual infrastructure from among a plurality of available cloud infrastructures;
  map each of a plurality of blocks of the software architecture blueprint to a corresponding block of the virtual infrastructure using a map that depends on a type of the virtual infrastructure, wherein each of the plurality of blocks identifies the infrastructure resources to be instantiated in the selected virtual infrastructure;
  connecting to the virtual infrastructure; and
  translating one or more corresponding blocks of the software architecture blueprint into an environment for deployment on the virtual infrastructure, wherein the translation provisions the infrastructure resources as computational resources including at least one of virtual machines, containers, networks, or storage in the virtual infrastructure based on the software architecture blueprint.

17. The method of claim 16, further comprising:
  enabling the user to select the corresponding block for each block from the virtual infrastructure, wherein the virtual infrastructure is selected from among a plurality of cloud infrastructures comprising Amazon Web Services (AWS), Microsoft Azure and Google Cloud Platform (GCP).

18. The method of claim 16, further comprising:
  storing the plurality of blocks, and the one or more corresponding blocks against each of the plurality of blocks, wherein each of the one or more corresponding blocks represents an implementation, of each of the plurality of blocks, in the virtual infrastructure, and wherein each of the plurality of blocks depends on the type of the virtual infrastructure; and
  storing a plurality of mappings for each of the plurality of blocks, wherein each of the plurality of mappings is applicable to a particular type of the virtual infrastructure, and wherein each of the plurality of mappings correlates blueprint-defined infrastructure components with provider-specific resource types in the virtual infrastructure.

19. The method of claim 16, further comprising:
  generating the virtual infrastructure conforming to one or more predefined principles of cloud architecture design; and providing an observability, wherein the observability includes a visibility into a cost performance, a security, and an operational health of the manifested infrastructure.

20. The method of claim 16, further comprising:

generating one or more new agents and manifestations for detection of one or more anomalies in the environment; and employing generative AI methodologies to facilitate identification and mitigation of infrastructure issues.

* * * * *